Patented Jan. 11, 1927.

1,613,673

UNITED STATES PATENT OFFICE.

IWAN OSTROMISLENSKY, OF NEW YORK, N. Y., ASSIGNOR TO THE NAUGATUCK CHEMICAL COMPANY, OF NAUGATUCK, CONNECTICUT, A CORPORATION OF CONNECTICUT.

PROCESS FOR MANUFACTURING PLASTIC COMPOSITIONS AND PRODUCTS OBTAINED THEREBY.

No Drawing.  Application filed January 29, 1925.  Serial No. 5,452.

This invention relates to methods of compounding styrol and to the products obtained thereby. More particularly, it relates to compounding styrol with rubber, gutta percha, balata, and other elastic and plastic gums. The invention does not contemplate the addition of styrol to these caoutchouc-bearing materials, for the principal object of the invention is to plasticize styrol. A further object is to provide a method for obtaining a polymerized styrol which has a nacreous lustre.

With a particular embodiment in mind, but without intention to limit the invention beyond what is required by the prior art, the invention, briefly stated, consists in dissolving rubber, gutta percha, balata, and the like in styrol and polymerizing the solution thus obtained.

As specific examples of the process, the following are given:

*Example I.*—The gum (rubber such as pale crepe, or balata, gutta percha, etc) unvulcanized or vulcanized, is dissolved directly in substantially pure styrol. The solution is then polymerized to tough meta styrol in accordance with the methods already known, or according to the method set forth in application Serial No. 725,658, filed July 12, 1924. As the heating is continued, the solution, which first resembles any rubber solution in its transparency, gradually becomes cloudy and by the time polymerization is complete, the solution has been converted into a white or whitish solid product, depending upon the quantity and nature of the gum introduced. Very satisfactory products have been obtained with amounts of pale crepe varying from 1 to 5%, and it is possible to employ as much as 10% or greater. As the quantity of the gum is increased, the properties of the product will vary from those of a modified styrol to those of gum modified by the presence of styrol. In this example, the limit is the amount which can be dissolved in a given equantity of styrol.

*Example II.*—A mixture of styrol and a rubber solution in a different solvent, such as xylene, is polymerized at approximately 135°–140° C. for 100 to 48 hours, according to the conditions set forth in application Serial No. 711,585, filed May 7, 1924, for the polymerization of mixtures of styrol with other hydrocarbons. The solvent may then be removed by steam distillation, or the styrol-rubber precipitated from solution, or the solution may be used directly as a varnish. In the latter instance, coloring material may be added if desired.

Where adhesion is required between a pure styrol glass surface and another surface to which styrol will not adhere readily, as for example a rubber surface, a polymerized styrol-rubber-xylene solution may be used as a primary coating to be followed by a coating of styrol itself.

Among the advantages gained by the application of the methods herein outlined are a decreased sensitivity to shock, greater malleability and flexibility, enhanced machining properties, and nacreous color effects. Alpha meta styrol or tough transparent polymerized styrol is not easily shattered by a hammer blow. But when 5% of a gum such as rubber has been dissolved therein, the resistance to shock is increased markedly. In many cases the product cannot be split by a chisel, but the chisel penetrates the mass in much the same manner as it would penetrate a malleable metal such as lead. Thin sheets of gum-containing polymerized styrol are appreciably more flexible than alpha meta styrol sheets. When machined in a lathe, the new material cuts with a longer shaving than alpha meta styrol. The addition of a gum to polymerized styrol, in quantities of 1% to 5%, results in the formation of a translucent to opaque product, which possesses a peculiar nacreous lustre which may be used to advantage in preparing colored articles which are to show color effects similar to those of coral and mother-of-pearl.

The term tough polymerized styrol used in this application is to be understood as generic to tough polymerized styrol and its homologues. The term gum includes rubber, gutta percha, balata, and other resins and gums usually placed in the same category. By substituting or combining various of these materials and by varying the amounts added, corresponding changes and new effects may be wrought upon the properties of the final product.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A method of compounding styrol which comprises incorporating a relatively small proportion of a gum with unpolymerized styrol by dissolution in a common solvent, and polymerizing the solution at approximately 135°–140° C. for a length of time sufficient to form therein a tough polymerized styrol.

2. A method of compounding styrol which comprises incorporating less than approximately 10% of a gum with unpolymerized styrol by dissolution in a common solvent, polymerizing the solution at approximately 135°–140° C. for a length of time sufficient to form therein a tough nacreous polymerized styrol, and thereafter removing the solvent.

3. As a new product, a gum-containing tough polymerized styrol having a nacreous lustre, the proportion of gum being considerably less than the amount of styrol.

4. As a new product, a gum-containing tough polymerized styrol having a nacreous lustre, and possessing greater flexibility than alpha meta styrol, the percentage of gum being a relatively small fraction of the amount of styrol.

5. As a new product, a gum-containing tough polymerized styrol having a nacreous lustre, more flexible and less horn-like than alpha meta styrol, the amount of gum being less than approximately 10% of the amount of styrol.

6. As a new product, a gum-containing tough polymerized styrol having a nacreous lustre, more flexible, less horn-like, and easier to machine than alpha meta styrol, the gum content being less than approximately 10%.

7. As a new product, a polymerized styrol having a nacreous lustre, more flexible, less horn-like, easier to machine than alpha meta styrol, and cutting somewhat like a malleable metal, said product containing approximately 5% of rubber.

Signed at Cromwell, county of Middlesex and State of Connecticut, this 26th day of January, 1925.

IWAN OSTROMISLENSKY.